(12) United States Patent
Arnow

(10) Patent No.: US 6,434,738 B1
(45) Date of Patent: Aug. 13, 2002

(54) SYSTEM AND METHOD FOR TESTING COMPUTER SOFTWARE

(76) Inventor: David Arnow, 671 E. 17th St., Brooklyn, NY (US) 11230-1703

( * ) Notice: Subject to any disclaimer, the term of this patent is extended or adjusted under 35 U.S.C. 154(b) by 0 days.

(21) Appl. No.: 09/296,341

(22) Filed: Apr. 22, 1999

(51) Int. Cl.$^7$ ................................................. G06F 9/44
(52) U.S. Cl. .......................... 717/106; 714/25; 714/35; 714/45; 714/57; 709/202; 717/107; 717/124; 717/127; 707/513
(58) Field of Search ........................... 717/4, 5, 101, 717/107, 124, 127, 131; 714/2, 4, 7, 25, 57, 35, 45, 47; 709/202; 707/513

(56) References Cited

U.S. PATENT DOCUMENTS

| | | | | |
|---|---|---|---|---|
| 5,398,313 A | * | 3/1995 | Kojima et al. .................. | 717/2 |
| 5,448,740 A | * | 9/1995 | Kiri et al. .................... | 717/155 |
| 5,475,843 A | * | 12/1995 | Halviatti et al. ................ | 717/4 |
| 5,485,620 A | * | 1/1996 | Sadre et al. ................... | 717/10 |
| 5,754,860 A | * | 5/1998 | McKeeman et al. ........... | 717/4 |
| 5,758,061 A | | 5/1998 | Plum ........................... | 714/35 |
| 5,790,789 A | * | 8/1998 | Suarez ........................ | 709/202 |
| 5,838,975 A | * | 11/1998 | Abramson et al. ............. | 717/4 |
| 5,850,511 A | * | 12/1998 | Stoecker et al. .............. | 714/38 |
| 5,862,380 A | * | 1/1999 | Brady ........................... | 717/4 |
| 5,867,653 A | * | 2/1999 | Aras et al. ................... | 709/204 |
| 5,892,949 A | * | 4/1999 | Noble ........................... | 717/4 |
| 5,966,532 A | * | 10/1999 | McDonald et al. ........... | 717/105 |
| 5,974,446 A | * | 10/1999 | Sonnenreich et al. ........ | 709/204 |
| 6,002,869 A | * | 12/1999 | Hinckley ...................... | 717/4 |
| 6,003,046 A | * | 12/1999 | Nielsen ....................... | 707/513 |
| 6,058,393 A | * | 5/2000 | Meier et al. .................. | 707/10 |
| 6,195,528 B1 | * | 2/2001 | Young et al. ................ | 434/307 |
| 6,201,948 B1 | * | 3/2001 | Cook et al. ................. | 434/350 |
| 6,216,237 B1 | * | 4/2001 | Klemm et al. ............... | 714/38 |
| 6,226,786 B1 | * | 5/2001 | Hickman et al. ............. | 717/4 |
| 6,263,491 B1 | * | 7/2001 | Hank ........................... | 717/4 |
| 6,272,551 B1 | * | 8/2001 | Gish .......................... | 709/315 |
| 6,275,982 B1 | * | 8/2001 | Nassor ........................ | 717/5 |
| 6,282,701 B1 | * | 8/2001 | Wygodny et al. ............ | 717/4 |
| 6,308,315 B1 | * | 10/2001 | Dice et al. .................. | 717/106 |

OTHER PUBLICATIONS

Title: A Graphic–Based Programming–Support System, Author: Frei et al, ACM, Aug. 1978.*

* cited by examiner

Primary Examiner—Gregory Morse
Assistant Examiner—Chameli Chaudhuri Das
(74) Attorney, Agent, or Firm—Kenyon & Kenyon

(57) ABSTRACT

A system and method is provided in which the correctness of computer code fragments may be tested. In an example embodiment, a web-based automatic code correctness checking tool is provided for distance learning. A student may submit to the system a solution to a selected exercise. The solution is processed and verified by a server system, which may provide hints and/or error messages to the student if the solution in incorrect. A system and method for setting up exercises for distance learning courses is also provided.

20 Claims, 10 Drawing Sheets

Name: | Precedence Rules | ⌐5100

Title: | Writing an arithmetic expression | ⌐5200

Status:  ○ Not available
         ○ Viewable only
         ● Accepting submissions ⌐5300

☑ Assign due date: | March ⇕ | 15 ⇕ | 1999 ⇕ | ⌐5400

Submission type:  ● Fragment of code ⌐5500
                  ○ Complete source(s)/Data submission ⌐5550

Language: | C ⇕ | ⌐5600

5750⌐ | Save |   | Undo changes | ⌐5775

Instructions for students:                        5700

| Assume that three int. variables, x, y and z, have been defined and are given values. Write an expression whose value is the product of x and the sum of y and z. |

FIG. 5

Compilation Configuration

Code Prepend 6100

```
#include<stdio.h>
main(){
    int x=3, y=7, z=10, w=2000;
    w=
```

6150 [ Save ]   [ Undo changes ] 6250

Code Append 6200

```
;
if (w==100){
    fprintf (stderr, "Did you forget your");
    fprintf (stderr, "precedence rules?\n");
    exit(1),
} else if (w'=51){
    fprintf (stderr, "wrong Expression:");
    fprintf (stderr, "recheck instructions!\n");
    exit(1)
}else
    exit(0);
}
```

6175 [ Save ]   [ Undo changes ] 6275

FIG. 6

Output Configuration

☑ Make sure exit code is [0]

☐ Standard Output

[text area 8300]

Space Comparison Mode
● Exact
○ Map sequences to 1 space
○ Strip all white space

Line Comparison Mode
● Exact
○ Eliminate empties

Case sensitive
● Ignore case
○ Check case

☐ Strip last carriage return    ☐ Treat as reg. exp.

[ Save ]    [ Undo changes ]

---

Hint Configuration

On failure show user:
☐ stdout    ☑ stderr

Provide a hint on:

☑ Compilation failure:    [Just write an expression: nothing else]

☐ Link failure:    [                    ]

☐ Runtime error:    [                    ]

☐ Exit code error:    [                    ]

☐ Incorrect output:    [                    ]

FIG. 8

```
<@NAME>                   ⌒9000
Summing header-organized integers in standard output
</@NAME> ⌐9100
                       ⌒9150
<@INSTRUCTIONS>
Standard input consists of an integer header, N,
followed by N integers, all separated by "white space".
Write piece of C code that computes the sum of the N
integers that follow the header and stores the value
in a variable called
         sum
You can assume that the following int variables have
already been declared:
         x, i, n, sum
<@/Instructions>    ⌒9175
                                ⌒9200
<@FRAMEWORK FILE="main.c">
#include      <stdio.h>           ⎫
                                  ⎬ 9225
main() {                          ⎪
      int    x, i, n, sum, v;    ⎭
<@/FRAMEWORK>
<@STUDENT FILE="main.c" NAME="solution">
      fscanf(stdin,"%d",&n);      ⎫
      sum=U;                      ⎪
      for (i=0; i<n; i++) {       ⎬ 9275
            fscanf{stdin,"%d",&x);⎪
            sum += x,             ⎭
<@/STUDENT>        ⌒9300
<@FRAMEWORK FILE="main.c">
      v = fscanf(stdin,"%d",&x);  ⎫
      if (v==EOF || sum!=x)       ⎬ 9275
            exit(1);              ⎪
      exit(0);                    ⎭
}
<@/FRAMEWORK>   ⌒9250

<@TEST NAME="test1">
<@INPUT>                ⌒9300
3
100 2 300
402
<@/INPUT>   ⌒9325
<@EXIT CODE>
0
</@EXIT>    ⌒9400
<@HINT>
Recheck your loop logic!    ⌒9410
<@/HINT>
<@STDOUT>
      <@FILTER SCRIPTLANGUAGE=ksh>   ⌒9500
            none                      ⌒9510
      </@FILTER>
</@>
<@STDERR>
      <@FILTER SCRIPTLANGUAGE=ksh>   ⌒9515
            none                      ⌒9520
      <?@FILTER>
</@>
<@/TEST>
                                :
```

FIG. 9A

```
<@TEST NAME="test2">
<@INPUT>
0
0
<@/INPUT>
<@EXIT CODE>
0
</@EXIT>      ⌐9415
<@HINT>
Recheck your loop logic! Watch out for the ZERO case!
<@/HINT> ⌐9420
<@STDOUT>
        <@FILTER SCRIPTLANGUAGE'ksh> ⌐9525
        none
        </@FILTER>                            9550
</@>
<@STDERR>
        <@FILTER SCRIPTLANGUAGE'ksh> ⌐9575
        none                                  9580
        </@FILTER>
</@>
<@/TEST>
```

SYSTEM AND METHOD FOR TESTING COMPUTER SOFTWARE

FIELD OF THE INVENTION

The present invention relates to a computer-based system and method for testing computer software (code).

BACKGROUND INFORMATION

Distance learning is an educational process in which a student and an instructor are separated from each other in time, space, or both.

A distance learning technology is one that facilitates distance learning. Examples include the Internet and interactive video.

Although there have been some long-standing distance learning institutions (e.g., National Technical University, U.S., and Open University, U.K.), there has recently been an explosion of interest in distance learning on the part of universities. The driving technology behind this trend has been the Internet, or the world-wide web. Distance learning depends on the web's ability deliver instructional material to students. Distance learning also benefits in many fields from the web's ability to interact with students. In some disciplines, for example, literature, web-based interactivity is not viable. In others, especially quantitative disciplines such as chemistry or physics, web-based interactivity is quite workable. Web-based interactivity increases educational effectiveness and decreases cost.

Ironically, web-based interactivity in most areas of Computer Science has not, in the past, been achievable. This is because the "product" of a Computer Science exercise is a fragment of a program (e.g., a statement, statements, or portion of a statement which does not, in and of itself, constitute a complete computer program), or occasionally, a complete program. Because there are many ways of writing a correct piece of code, and even more ways of writing an incorrect one, multiple-choice, textual fill-in, true/false and other standard modes of interactivity used in other fields are inappropriate for Computer Science instruction.

The present invention solves this problem by allowing web-based distance learning software to interact with students writing code fragments.

The shortage of computing professionals in the United States is well known, and has led to calls by leaders in the computing industry for special immigration dispensations. Yet, this shortage is not without great irony. Each year, great numbers of students embark on a Computer Science major, only to be lost through retention failure. It is common for fifty per cent of the cohort to fall by the wayside through each of the first two or three courses in the undergraduate Computer Science sequence.

The cause of this phenomenal attrition rate lies in one of the remarkable differences between math education and foreign language study, on the one hand, and Computer Science education, on the other hand. Whereas language and math students are given large numbers of drill exercises, Computer Science homework tends to consist of a small set of assignments in which complete computer programs must be written.

Writing a complete program requires simultaneous integration of many cognitive elements: syntax and semantics of language constructs, elementary use patters, algorithms, and so on. Without mastery of these elements, students cannot make headway with assignments. Frustration ensues, and the point of the homework is lost. Some students manage—either through intuition, prior experience, or perhaps personality idiosyncrasies—to carry out these assignments. Many fail, however, due to the lack of the opportunity to master the nuts and bolts of programming.

One solution to this problem is to reform Computer Science pedagogy by introducing programming drills, not to replace traditional closed labs and programming homework, but to provide a basis for student success in those areas.

It is remarkable that a technique that is fundamental in the teaching of foreign languages and mathematics—both closely related to Computer Science—is unused in Computer Science education today. A question to ask is: if drill is so useful, why isn't it standard in Computer Science education?

The answer lies in the nature of computer code. A response to a short exercise in a mathematics or foreign language can be easily and reliably checked by a human being. Students themselves can check their own solutions against a given set of answers. This is not the case with programs or even modest program fragments. Code can be verified manually only with a great expenditure of human effort. Without a means to check answers, drill is meaningless.

The present invention solves this problem by facilitating the creation of programming drills, and providing automatic, reliable checking of such exercises.

Nearly all distance learning technology used in Computer Science education is implicitly modeled on or explicitly imported from non-Computer Science disciplines. These systems are characterized by delivery of material (textual, graphic, animation), on-line real-time or asynchronous discussion groups, "interactive" questions of the traditional multiple-choice/textual fill-in type with instantaneous feedback, on-line tests based on questions of this type, collections of homework and roster maintenance.

Distinct from the above described comprehensive distance learning systems are automatic homework program checking systems. These systems check the correctness of entire programs or at least complete modules thereof, giving instant feedback to the student. They have been around since the mid-1980s and reflect the naturally evolving automation of steps that an instructor would take to check the correctness of a submitted homework program by trying to run the program directly on a computer and witness the results. These systems are characterized by the following limitations:

correctness is determined by comparing output of a single file with an expected output;

an assignment must be a complete program or program module; and the system works with only one programming language.

Finally, there are some cases of systems that check other characteristics besides correctness, e.g., style or various software quality metrics. These systems suffer from the last two of these above-listed limitations.

SUMMARY

The present invention is directed to a system for checking the correctness of computer code fragments. In an example embodiment, a web-based automatic code correctness checking tool is provided for distance learning. A student may submit to the system a solution to a selected exercise. The solution is processed and verified by a server system, which may provide hints and/or error messages to the student if the solution in incorrect. The present invention is also directed to a system and method for setting up exercises for distance learning courses.

BRIEF DESCRIPTION OF THE DRAWINGS

FIG. 5 shows an example a first portion of a new exercise creation screen in accordance with the example embodiment of the present invention.

FIG. 6 shows an example of a second portion of the new exercise creation screen in accordance with the example embodiment of the present invention.

FIG. 8 shows an example of a fourth portion of the new exercise creation screen in accordance with the example embodiment the present invention.

FIG. 9 shows an example of a new exercise created for a text-based faculty interface in accordance with the example embodiment of the present invention.

DETAILED DESCRIPTION

The present invention is described herein in the context of an educational system for testing software code fragments. However, the principles of the present invention are not so limited, and may be used in a variety of other types of application. For example, the present invention may be incorporated into a system for testing mathematical expressions provided by a user. Also, the present invention may be incorporated in a commercial test system for testing code fragments for professional programmers. Other applications are, of course, possible.

Additionally, the example embodiment of the present invention is described in the context of an Internet-based or web-based system. However, the present invention may utilize other networks such as a local area network, wide area network, a telephone network. Moreover, the present invention can even be implemented with a server system and client systems executing on the same processor.

Figure 1:
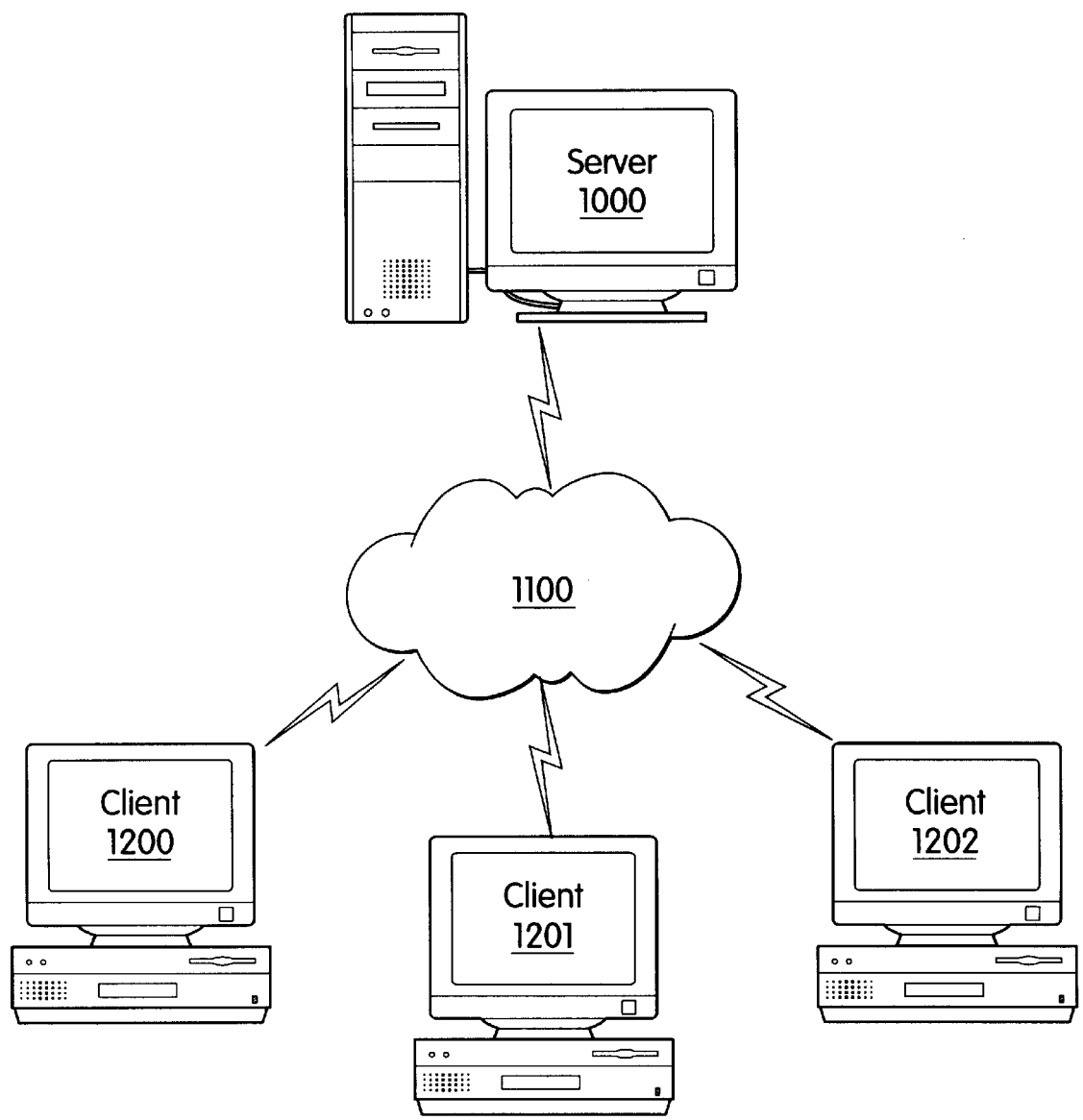
FIG. 1 illustrates the overall system architecture of an example embodiment of the present invention.

Overall System Architecture: Referring now to FIG. 1 of the drawings, there is illustrated the overall system architecture of one example embodiment of the present invention. The system includes a server system 1000 which provides students with software programming exercises, and also includes a system for automatically checking the correctness of code fragments provided by the students. The server system 1000 may include, for example, memory and storage devices for storing programs and data, one or more data processors and a communication interface to allow the server system to communicate with the students. The server system 1000 may further include input devices such as a keyboard and a mouse.

As shown in FIG. 1, students at one or more client workstations 1200–1202 communicate with the server system 1000 over a network 1100 such as the Internet. The client workstations 1200–1202 may include, for example, memory and storage devices, data processors, a communication interface, and input and output devices (e.g., a display device, etc.). The student's "client" software may execute at the same site and/or processor as the server system, or on a client workstation data processor.

Additionally, in accordance with the example embodiment of the present invention, instructors at one or more of the client workstations 1200–1202 may also interface with the server 1000 over the network in order to initialize and change exercises for a given course.

Figure 2:
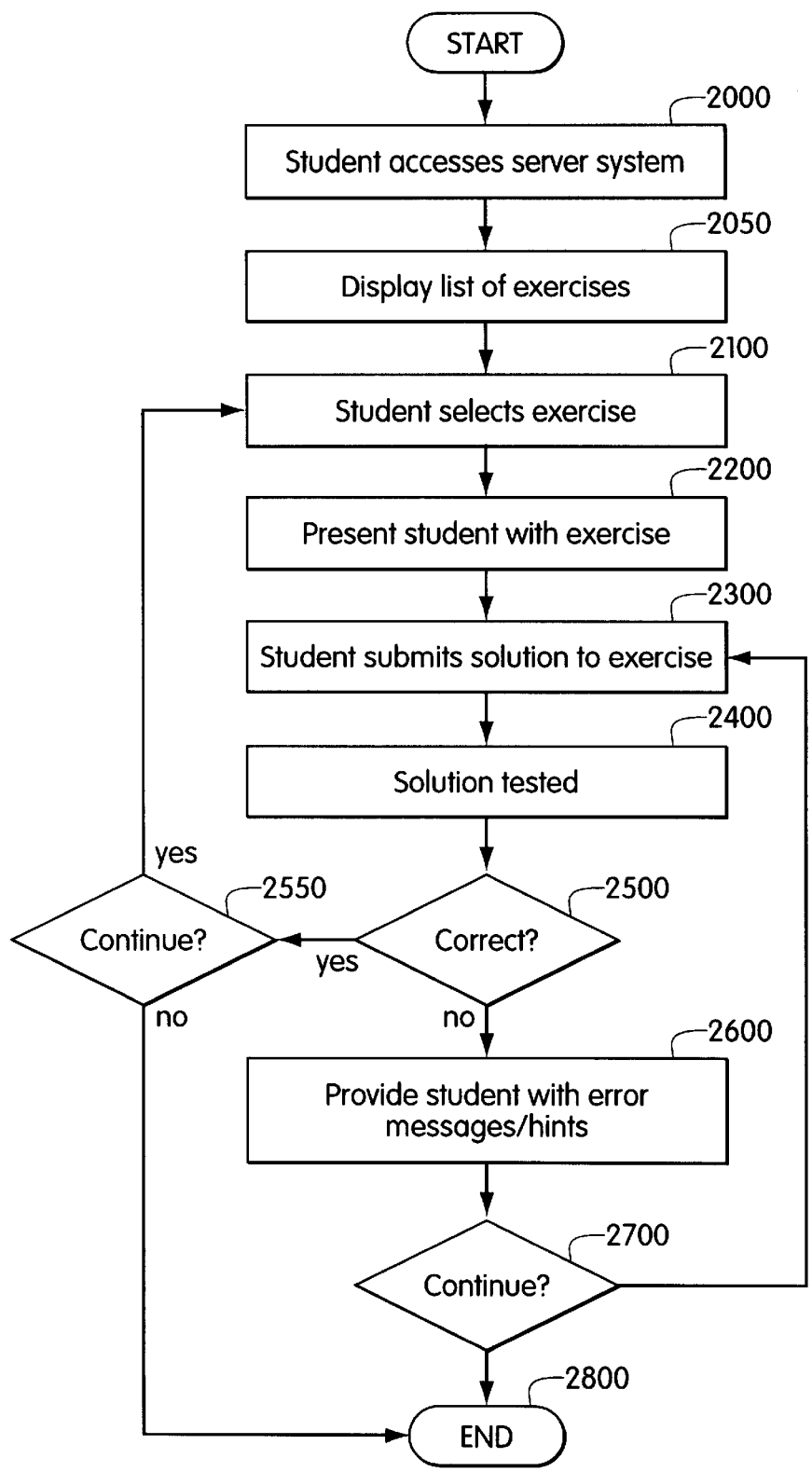
FIG. 2 is a flowchart illustrating the general operation of the example embodiment of the present invention.

General Operation: FIG. 2 is a flowchart illustrating the general operation of the example embodiment of the present invention. Initially, a student at a workstation accesses the server system (step 2000). If the server system is, for example, an Internet-based system, the student may access the server system using a browser, for example, Netscape® Navigator or Microsoft Internet Explorer. The student may be required to log into the system by providing a student or user identification, a password and possibly a course identification code (course ID).

The server system may then present the user with a list of student exercises using, for example, an HTML document, or a document provided by a Java applet (step 2050) or any other active content such as JavaScript or Visual Basic. An item on the list may then be selected by the student using, for example, a mouse or keyboard (step 2100).

After the user selects a particular exercise, the server system may present the user with the exercise (step 2200). The exercise may be displayed using, for example, an HTML document on a display device at the student's workstation. The HTML document may include a text area in which the student may type in the solution. For example, the exercise may be to code a sorting algorithm. Thus, the programming language to use, input parameters, variable definitions, format of the output expected, etc. may be described to the student. In accordance with the present invention, the student may be required to provide a code fragment as a solution, rather than a complete subroutine or program. For example, the student may not be expected to provide variable or environment declarations. Additionally, the student may not be expected to provide or know what auxiliary libraries may be necessary to actually execute the code fragment.

As an example, in one exercise, a student may be required to write a statement in the C language to print the message Hello World on a single line (the "Hello World" exercise). Thus, one correct solution to this would be for the student to input the following:

printf ("Hello World\n");

Next, the student submits the solution to the exercise (step 2300). In the example embodiment, the student may be required to type the solution in an input area of a displayed HTML document. In an alternative embodiment of the present invention, if the medium used to present the exercise is, for example, a Java applet or some other active program, a TCP connection may be established to contact the server. The server may then, for example, "listen" to a particular port or socket associated with that connection. The exercise solution could then be transferred to the server via the connection. It is also possible for the student to provide the solution via an e-mail message, or via another type of messaging system. In any event, the student's solution is transmitted to the server via, for example, a network or software interface.

After the solution is submitted, the server automatically tests the solution, i.e., the code fragment (module or program), provided by the student (step 2400). An example of how the server accomplishes this task is described in detail below.

The server next determines whether or not the student's code fragment is correct (step 2500). For example, the server may compare a return code received after executing the student's code fragment to an expected return code indicative of a correct code solution. Other examples of how this determination is made is described in detail below.

If the student's code fragment is correct, the student may be queried as to whether or not the student wishes to attempt to solve another exercise (step 2550). If so, the student may again be asked to select an exercise (step 2100). Otherwise, the student may end the session (step 2800).

If the student's code fragment is not correct, the student may be provided with error messages and/or hints (step 2600). For example, if the student's code fragment resulted syntax errors (e.g., a compiler failure), the student may be provided with a hint as to how to correct the error.

After receiving any error messages and/or hints, the student may either continue (steps 2700, 2300), or may end the session (steps 2700, 2800).

Figure 3:
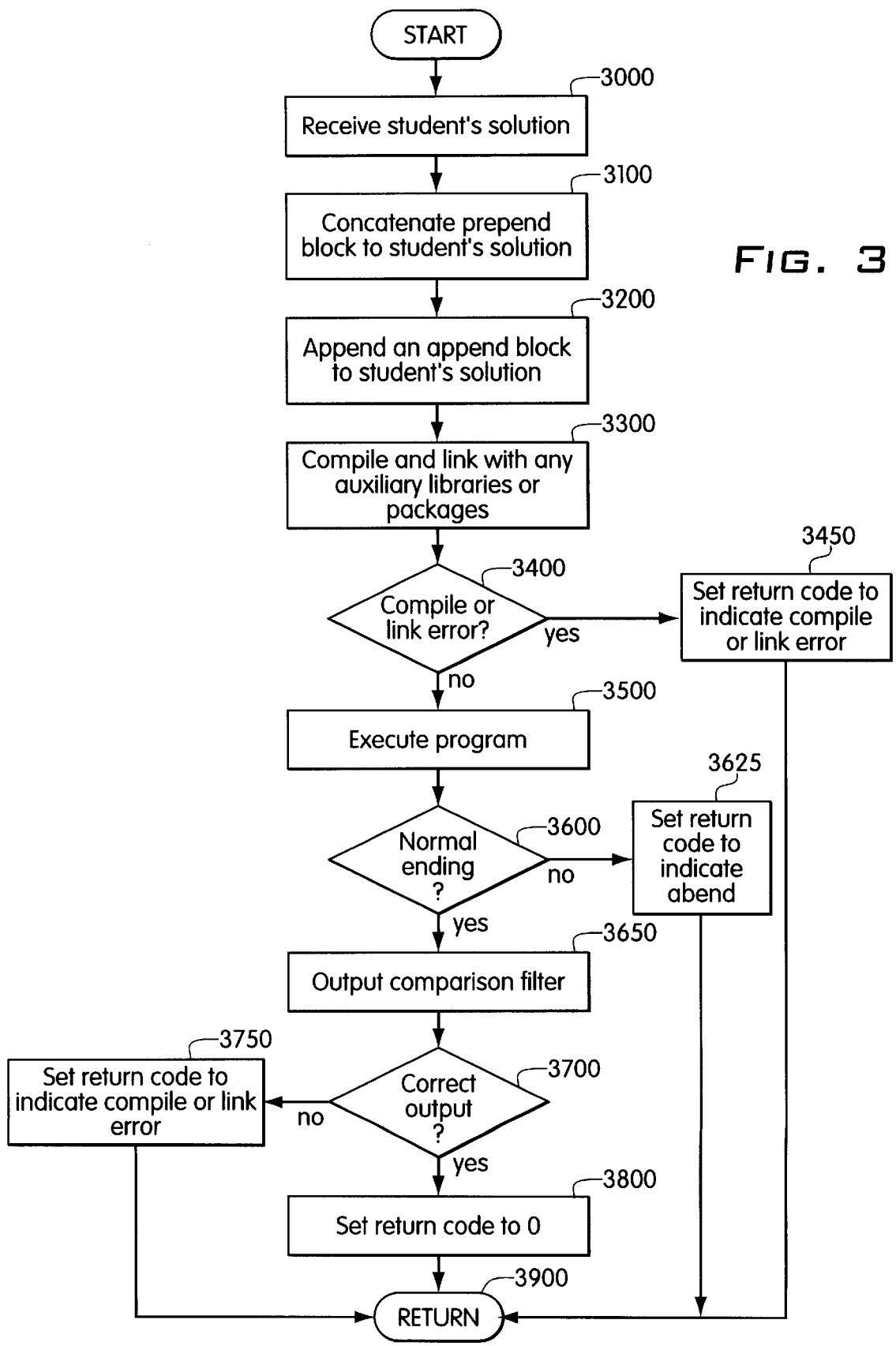
FIG. 3 is a flowchart illustrating a test procedure in accordance with the example embodiment of the present invention.

Solution Test Procedure: FIG. 3 illustrates an example test procedure performed after a student submits an exercise solution. This may be performed at, for example, the server system. As shown in the flowchart of FIG. 3, the server receives the student's exercise solution (step 3000). Depending on the form in which the solution is received, i.e., text from an HTML message, an e-mail message, etc., the server may pre-process the solution to put it in the proper form.

Next, the server concatenates any prepend block associated with the selected student exercise onto the student's solution (step 3100). The prepend block may include, for example, zero or more lines of source code that should precede the student's exercise solution code fragment in a source file. For example, if the correct exercise solution is:

printf("Hello World\n");

the prepend block may include the following code:

include <stdio.h> main ( ) {

Next, the server appends to the student's solution any append block (which may includes zero or more lines of source code) that is associated with the selected student exercise (step 3200). For example, the append block for the above example may include the following:

}

Accordingly, the prepend block, the student's exercise solution and the append block, together form the source code for a complete program (function or subroutine), and may be stored in a source file, for example, on a memory device at the server system. In the example above, the complete source code includes the following:

```
include <stdio.h>
main() {
printf("Hello World\n");
}
```

In another embodiment of the present invention, the student may be required to provide multiple code fragments (modules or programs) as a solution to an exercise. In that case, portions of the student's solution may be preceded (and/or followed) by an append/prepend block of system supplied code (which is associated with the particular exercise), e.g.:

prepend block
   student code, part 1
append to part 1/prepend to part 2
   student code, part 2
append to part 2/prepend to part 3
   student code, part 3
append to part 3/prepend to part 4
   student code, part 4
append block Of course, the student may instead be required to provide solutions to more than one exercise at a time. Thus, each of the student code portions (i.e., parts 1–4 in the above example) may actually be solutions to one or more exercises.

After the complete source code file is formed, the server may then compile the complete source code file and may link the compiled file with any auxiliary libraries or packages necessary to execute the code (step 3300). The particular compiler used in this step depends, of course, on the programming language that the source code is in which may be determined by the person (i.e., the instructor) who created the exercise. For example, in the Hello World exercise described above, a C compiler is used.

The server next determines whether or not there were any compilation errors or link errors (step 3400). If so, the server may set a return code to indicate a compilation error or a link error (step 3450), and then may exit the test procedure (step 3900).

If there were no compilation errors or link errors, an executable program should now be available. Accordingly, the server may execute the program (step 3500). As part of this step, the program may be run within an environment determined by other data elements in the test. For example, the program may be run with a set of command-line arguments. The program may also be run with a collection of data defined as standard input. Also, the program may be run with a collection of zero or more additional files, each including a name and associated data.

After the program executes, the server may then determine whether or not the program ended normally (step 3600). For example, the server may test a return code from the executed program. Also, the server may include a timer function that may time the execution of the program to guard against, for example, a student inadvertently inputting an infinite loop as a solution to an exercise. Thus, if the program executes for longer than expected, the server may halt execution of the program.

If the program did not end normally, the server may then set a return code to indicate that the program ended abnormally (i.e., the program abended) (step 3625). The server may then exit from the test procedure (step 3900).

If the program ended normally, an optional output filter may then be applied to any program output (step 3650). For example, if, as part of the student's exercise, the student was supposed to write specific data to an output file, the server may process the data in the output file before determining whether or not the data is "correct." For example, the server may remove empty lines from the output. The server also may map lower case letters to upper case letter, or remove spaces, tabs, etc, from the output.

After the output data has been processed, the server may then determine whether or not the output data is "correct" (step 3700). For example, the server may determine whether or not the phrase "Hello World" was properly output. If the output data is not correct, the server may set a return code to indicate that the output was incorrect (step 3750), and then may exit from the test procedure (step 3900).

If the output data is correct, the server may set a return code to, for example, zero, to indicate that the exercise solution is correct (step 3800). The server may then exit from the test procedure (step 3900).

Hints and Messages: As described above, the system may provide to a student hints and messages, particularly if the student's exercise solution is incorrect. In one example embodiment, the hints and messages are stored in a database, and are transmitted to the student based on a return code from the test procedure.

Figure 4:
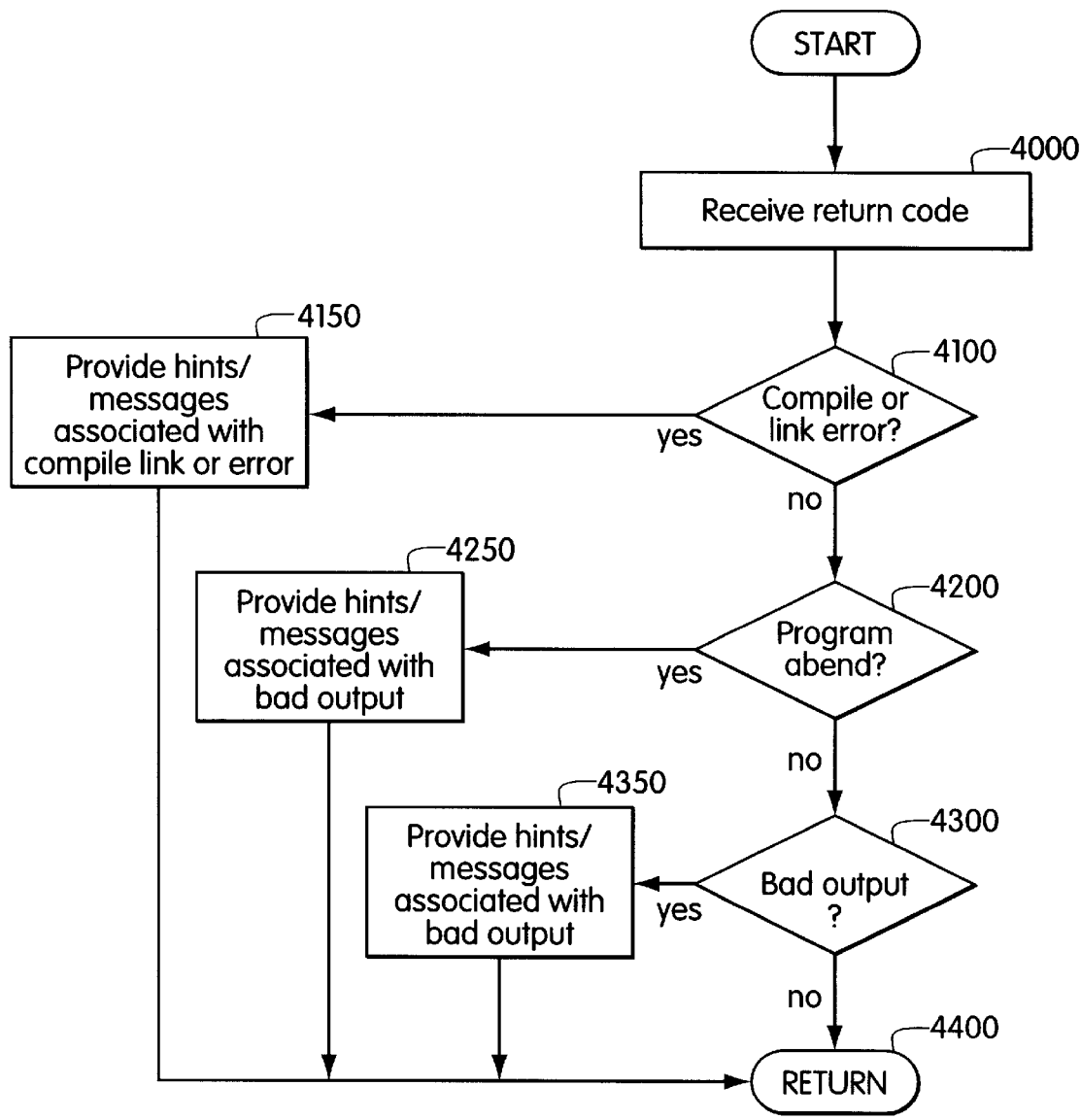
FIG. 4 is a flowchart illustrating a procedure to provide hints and/or suggestions to a student in accordance with the example embodiment of the present invention.

FIG. 4 illustrates a flowchart of one example of how hints and messages may be provided to a student. After a return code is received from the test procedure (step 4000), the server may first determine whether or not the return code indicates a compilation error or link error (step 4100).

If a compilation error or link error is detected, the server system may transmit to the student hints and/or messages associated with the particular error (step 4150). For example, if the return code indicates a compilation error (as indicated by, for example, a program language compiler program), the server system may retrieve from a database and transmit the following hints/error messages to the student:

Error: Compiler error.

Hint 1: Check your syntax.

Hint 2: Did you use the variable names provided?

Other hints and messages are, of course, possible.

If, instead, the return code indicates that the program abended (step 4200), the server may retrieve and transmit to the student hints and/or error messages associated with is error (step 4250). For example, if the return code indicates that server halted the execution of the program because the program execution time was too high, the server may retrieve and transmit to the student the following hints/error messages:

Error: Program halted; maximum execution time exceeded.

Hint 1: Check for infinite loop.

Hint 2: Check conditional in the loop.

If, instead, the server determines that the return code indicates that the output data was incorrect (step 4300), hints and/or error message associated with this type of error are provided to the student (step 4400).

After providing the student with the appropriate hints and/or error messages, the server may return from the hints procedure (step 4500).

Another Example: In another embodiment of the present invention, hints and/or error messages may be incorporated in, for example, the append block (described above). For example, assume the exercise is as follows:

Assume that three int variables, x, y and z have been defined and have given values. Write an expression whose value is the product of x and the sum of y and z.

The solution is, for example, x*(y+z) or (y+z)*x, but not x*y+z. Therefore, the prepend block may include the following:

```
include <stdio.h>
main() {
    int x=3, y=7, z=10, w=2000;
    w =
```

The append block may include the following:

```
;
if (w==100) {
        fprintf(stderr,"Did you forget your ");
        fprintf(stderr," precedence rules?\n");
    exit (1);
} else if (w!=51) {
        fprintf(stderr, "Wrong expression:");
        fprintf(stderr, "recheck instructions!\n");
        exit (1);
} else
        exit(0);
}
```

In this example, the variables have been initialized and conditional expressions have been set up so that if the expression is correct, the program exits with a return code of zero (silently). However, if the expression is wrong, the program exits with a return code of one, and, depending on whether or not the error was the "obvious" precedence error or some other error- generates one of two possible error messages to stderr.

Faculty Interface: In accordance with the example embodiment, to set up an exercise, an instructor or tester may be provided with a "faculty interface." In particular, exercises may be defined or configured from a client workstation (and/or a client application) using the faculty interface which may include, for example, a series of linked HTML documents. Information provided by an instructor related to new exercises may be stored at the server system. The new exercises may then be made available to students, as described above.

In an example embodiment, to set up an exercise, the instructor initially connects to the server system via, for example, the Internet, using a browser program such as Netscape. Once the instructor is connected to the system, the instructor may navigate through the faculty interface. All information provided by the instructor associated with an exercise may be stored in, for example, a database or file, accessible by the server system.

To create a new exercise, the instructor may navigate to a new exercise creation screen. FIG. 5 shows an example of a portion of a new exercise creation screen. In this screen, the instructor may fill in various information about the new exercise by typing in text, selecting items from pull down menus, clicking on check boxes, clicking on radio buttons, etc. Here, the instructor has already provided the name of the exercise 5100, i.e., "Precedence Rules," and the title of the exercise 5200, i.e., "Writing an arithmetic expression. The status of the exercise is set to "accepting submissions" 5300. In this case, solutions may be accepted from students through midnight of Mar. 15, 1999 (5400). In the example embodiment, a student will not be permitted to submit a solution to this exercise after this date.

As further illustrated, the type of submission expected from students is a fragment of code (5500). In this example embodiment, an exercise may instead be set up to receive complete modules (5550).

In the current example, the language selected is the C programming language (5600). Other languages such as, for example, FORTRAN, COBOL, PL/I, etc., may, of course, be selected. In the example embodiment of the present invention, the language selected determines which compiler will be used by the server system to compile a student's exercise solution.

The instructor may also provide instructions for the particular exercise being defined (5700).

All information input may be saved by clicking on a "save" button 5750. Alternatively, changes may be "undone" by clicking on an "undo changes" button 5775.

As described above, a prepend block and an append block may be associated with each defined exercise. In particular, the prepend block and append block "sandwiches" a student's solution to an exercise to form a compilable, and ultimately executable program. When the student submits, for example, a code fragment for a solution, the server system concatenates the code in the prepend block, the student's code, followed by the append block, and the result is compiled, linked, and executed. Accordingly, FIG. 6 illustrates a portion of the new exercise creation screen within which an instructor may define a prepend block and an append block. Here, the instructor has input a code prepend block 6100 and a code append block 6200, each of which may be saved by clicking on a corresponding save button 6150, 6175, respectively. Additionally, changes to the prepend block 6100 and the code append block 6200 may be canceled or "undone" by clicking on the corresponding "undo changes" button 6250, 6275, respectively.

Figure 7:
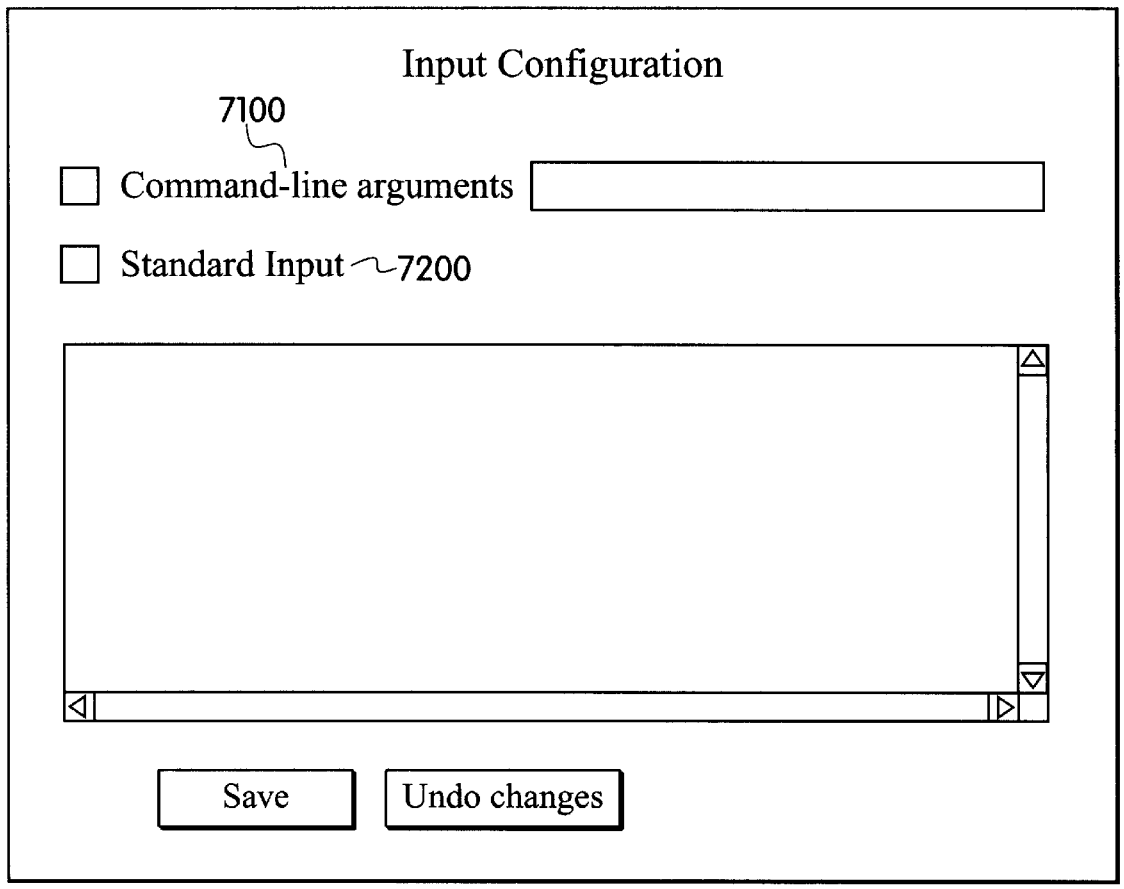
FIG. 7 shows an example of a third portion of the new exercise creation screen in accordance with the example embodiment of the present invention.

FIG. 7 illustrates a third portion of the new exercise creation screen. In this portion, the instructor may define an input configuration. Here, the instructor may specify command line arguments (7100) and/or standard input (7200) by clicking on a corresponding check box, and typing in data.

In accordance with the example embodiment of the present invention, the instructor may also specify an output configuration and a hint configuration. FIG. 8 illustrates a portion of the new exercise creation screen within which the instructor may specify an output configuration and a hint configuration for a new exercise.

In the output configuration portion 8100 of the screen, the instructor may specify how the student's solution (including any prepend block and append block) should be tested. In particular, the instructor may specify that the server system should test, for example, an exit status code or a standard output. If the instructor clicks on the exit code check box 8200, the instructor must also supply the value that the concatenated program must produce when correct. Here, an exit code of zero indicates that the program is correct.

Alternatively (or additionally), the instructor may input the expected output. In the example embodiment, the instructor may provide an output in a standard output text box 8300. During the test stage, the server system tests the output of the concatenated program against the output specified in the standard output text box 8300.

Below the standard output text box 8300 are output filter options. In particular, as described above in connection with FIG. 3, the output of the concatenated program may be filtered before it is tested against expected output. An instructor may designate various output filter parameters by enabling output filter options in the screen illustrated in FIG. 8. For example, the spacing of characters in the program output may be required to match expected output exactly. In that case, the instructor clicks on the "Exact" radio button 8400. Alternatively, a filter option may be enabled which maps sequences to a single space by clicking on the "Map sequences to 1 space" radio button 8425. A filter option to strip out white space (i.e., all spaces) from the output may be enabled by clicking on the "strip all white space" radio button 8450.

In the example embodiment, other filter options such as those related to line spacing, and those related to case sensitivity may also be enabled by clicking on radio buttons (8475, 8480, respectively). Filter options related to carriage returns and whether to treat the output as a regular expression may also be optionally enabled by clicking on an appropriate check box 8485, 8490 (respectively).

Changes to the filter options may be saved by clicking on a save button 8500, or canceled by clicking on an "undo changes" button 8550.

As noted above, in accordance with the example embodiment of the present invention, a student may be provided with hints and/or error message if the student's solution to the exercise is not correct, for example, if the student's solution causes compiler or link errors. Accordingly, a hint configuration portion 8600 of the new exercise creation screen may be provided to an instructor in order to allow the instructor to determine appropriate hints and error messages. In this portion, the instructor may select (by, for example, clicking on a check box) whether a failure should be displayed to the student via "stdout" or "stderr" 8650, 8675 (respectively).

Also, the instructor may designate upon which type of error or failure the student should be provided a hint, and what the hint should be. As shown in FIG. 8, for example, the instructor has indicated that the student should be provided a hint upon a compilation failure (8700), and the hint should be a message "Just write an expression: nothing else" (8725).

Once an exercise is completed, the server system may make the exercise available to students. For example, the title and course ID of the exercise may be inserted on the list from which students may select.

Importing Exercises: In accordance with another feature of the example embodiment an instructor may import or "borrow" an exercise from another instructor, and then simply tailor the imported exercise. For example, the instructor may be provided the ability to list other instructor's exercises, and may be able to copy selected exercises to the instructor's course files. Then, using screens similar to those described above in connection with creating a new exercise, the instructor may make changes to the copied exercise.

Additional Faculty Interface: In accordance with another feature of the present invention, a text-based interface is provided for instructors. In particular, instead of requiring an instructor to access and interface with a server system to set up a new exercise, the instructor may set up the new exercise "offline" with respect to the server system, and subsequently submit the exercise to the server system. After receiving the submitted new exercise, the server system processes it and add the new exercise to the system. This feature adds a great deal of flexibility to the system. For example, an instructor may create the new exercise when the instructor does not have access to a communication network to the server system. The instructor may then "upload" the new exercise to the server system when the instructor does gain access.

FIG. 9 illustrates an example of a new exercise submission. To create an exercise offline, an instructor creates a text file with text corresponding to fields and data similar to those described above in connection with the web-based faculty interface. These fields may be delimited by tags, for example. For example, in the example, the @NAME tags 9000, 9100 delimit text that corresponds to the name of the new exercise. In this case, the name of the new exercise is "Summing header-organized integers in standard output." This field corresponds to the exercise name field of FIG. 5 (element 5100). The @INSTRUCTIONS tags 9150, 9175 delimit instructions to be displayed to students (see, e.g., FIG. 5, element 5700).

The @FRAMEWORK tag 9200, 9250 delimit the text that corresponds to one or more prepend blocks 9225 and append blocks 9275 (or prepend/append blocks). Within this text is an additional tag (or tags) which identifies where the student's exercise solution should be inserted (9300). The text delimited by the @FRAMEWORK tags 9200, 9250, and the student's exercise solution (inserted at 9300) represent the concatenated source file which will eventually be compiled by the server system during the test phase of the system.

Other tags delimit text for other exercise data. For example, the @INPUT tag delimits test data which should be used as input for the concatenated file when executed. The @HINT tags 9400, 9410, 9415, 9420 delimit data corresponding to "hints" as discussed above in connection with FIG. 8. The @FILTER tags delimit data corresponding to output filters (see, e.g., FIG. 8).

Once the instructor has completed preparing the new exercise, the instructor can transmit the file containing the new exercise, and additionally data related to the instructors faculty ID, the course ID, etc., to the server system. For example, the instructor may use an e-mail system to transmit the file and other information. Alternatively, the instructor may transmit the information via an FTP connection, or over a standard model link. Other ways of transmitting the information are, of course, possible.

Once the file containing the new exercise is received by the server system, the server system processes it, stores the information contained therein, and makes the exercise available to students.

Other Embodiments: As is evident from the above, the example embodiment of the present invention provides a system and method which overcomes many of the problems associated with problems associated with distance learning in Computer Science education. While the present invention has been described in the context of a web-based distance learning application, the principles of the present invention may also be utilized in other applications in which portions of code and/or mathematical expressions must be tested.

What is claimed is:

1. A computer automated method for testing a program code fragment, comprising the steps of:
    receiving a computer program code fragment;
    automatically forming a concatenated computer program by performing at least one of pre-pending the computer program code fragment with a first computer program code block and appending the program code fragment with a second program code block;
    automatically compiling the concatenated program;
    automatically testing the compiled program; and
    displaying an error message if the tested program is not correct.

2. The method according to claim 1, wherein the automatically testing step includes the steps of:
    executing the compiled program; and
    comparing output of the executed program to expected output.

3. The method according to claim 1, wherein the automatically testing step includes the steps of:
    executing the compiled program; and
    comparing an exit code of the executed program to an expected exit code.

4. The method according to claim 1, further comprising the steps of:
    automatically linking the compiled program with at least one of functions and subroutines of an auxiliary library.

5. The method according to claim 1, wherein the automatically testing step includes the steps of:

detecting if the concatenated program was successfully compiled; and
    if a compilation error is detected, determining that the tested program is not correct.

6. A computer automated method for testing program code fragments, comprising the steps of:
    receiving at least two computer program code fragments;
    automatically forming a concatenated computer program by concatenating together the at least two computer program code fragments and at least three code blocks, each of the at least two computer program code fragments being positioned between at least two of the at least three code blocks;
    automatically compiling the concatenated program;
    automatically testing the compiled program; and
    displaying an error message if the tested program is not correct.

7. A computer based system for automatically testing a program code fragment, comprising:
    a server system, the server system receiving a program code fragment from a client system;
    a memory coupled to the server system; and
    at least one of a prepend computer program code block and an append computer program code block stored in the memory, the server system automatically retrieving the at least one of the prepend computer program code block and the append computer program code block from the memory and forming a concatenated program from the program code fragment and the at least one of the prepend computer program code block and the append computer program code block upon receiving the program code fragment, the server system testing the concatenated program and transmitting results of the testing to the client system for display at the client system.

8. The system according to claim 7, wherein the server system is configured to compile the concatenated program and test a result of the compilation as at least a part of the testing of the concatenated program.

9. The computer based system according to claim 8, wherein the server system is configured to execute the compiled program and compare output of the executed program to expected output.

10. The computer based system according to claim 8, wherein the server system is configured to execute the compiled program and compare an exit code of the executed program to an expected exit code.

11. The computer based system according to claim 8, wherein the server system is further configured to automatically link the compiled program with at least one of functions and subroutines of an auxiliary library.

12. The computer based system according to claim 8, wherein the server system is configured to detect if the concatenated program was successfully compiled, and configured to determine that the concatenated program is not correct if a compilation error is detected.

13. A computer automated method for testing a program code fragment, comprising:
    receiving a computer program source code fragment;
    automatically forming a concatenated computer program by performing at least one of pre-pending the computer program source code fragment with a first computer program source code block and appending the program code fragment with a second program source code block;

automatically compiling the concatenated program to form object code;

automatically testing for a compilation error; and providing an indication of an error if a compilation error is detected.

14. The method according to claim 13, wherein the automatically testing step includes:

executing the compiled program; and comparing output of the executed program to expected output.

15. The method according to claim 13, wherein the automatically testing step includes:

executing the compiled program; and comparing an exit code of the executed program to an expected exit code.

16. The method according to claim 13, further comprising:

automatically linking the compiled program with at least one of functions and subroutines of an auxiliary library.

17. The method according to claim 13, wherein the computer program source code fragment is received from a remote client by a server, and the server performs at least the forming and compiling steps.

18. The method according to claim 17, further comprising:

displaying an error message at the remote client if the tested program is not correct.

19. The method according to claim 18, wherein the error message indicates a compilation error.

20. The method according to claim 13, wherein in the forming step, a plurality of lines of source code are prepended or appended to the computer program source code fragment.

* * * * *